United States Patent [19]

Osaki

[11] Patent Number: 5,040,171

[45] Date of Patent: Aug. 13, 1991

[54] CALL RESTRICTING METHOD IN PACKET SWITCHING NETWORK AND NETWORK CONTROLLER HAVING CALL RESTRICTING FUNCTION

[75] Inventor: Yoshiro Osaki, Tokyo, Japan

[73] Assignee: Kabushiki Kaisha Toshiba, Kawasaki, Japan

[21] Appl. No.: 469,073

[22] Filed: Jan. 23, 1990

[30] Foreign Application Priority Data

Jan. 24, 1989 [JP] Japan ................................ 1-14898
Jan. 24, 1989 [JP] Japan ................................ 1-14899

[51] Int. Cl.$^5$ ............................................. H04J 3/26
[52] U.S. Cl. ........................................ 370/17; 370/60
[58] Field of Search ................. 370/17, 58.1, 60, 60.1, 370/94.1, 94.2, 94.3, 79

[56] References Cited
U.S. PATENT DOCUMENTS 4,920,529  4/1990  Sasaki et al. ......................... 370/17

Primary Examiner—Douglas W. Olms
Assistant Examiner—Melvin Marcelo
Attorney, Agent, or Firm—Finnegan, Henderson, Farabow, Garrett and Dunner

[57] ABSTRACT

A call restricting method for a packet switching network, by which acception of a call issued from a call origination terminal is restricted to thereby previously prevent the occurrence of a congestion in the packet switching network, in which the call origination terminal informs an associated packet switching node connected to terminal, of traffic parameters indicative of an application state of trunk lines to be connected between the call origination terminal and a destination terminal, and the packet switching node, when informed of these traffic parameters and the calling data, decides one of the trunk lines to be used according to the calling data, and estimates a line quality of the decided trunk line when a new call origination terminal is also added on the basis of a trunk rate of the decided trunk line, traffic parameters of terminals using the trunk line on a multiplex basis at this time and traffic parameters informed from the new call origination terminal.

22 Claims, 11 Drawing Sheets

CALL RESTRICTING METHOD IN PACKET SWITCHING NETWORK AND NETWORK CONTROLLER HAVING CALL RESTRICTING FUNCTION

BACKGROUND OF THE INVENTION

1. Field of the Invention

The present invention relates to a call restricting method in a packet switching network and a network controller having a call restricting function and, more particularly, to a call restricting method which, when it is anticipated that packet communication with a transmission quality demanded by respective terminals becomes difficult due to the fact that an excessive quantity of data causes the network to fall into its congestion state, restricts the calling operation of call sending terminals to thereby previously prevent the network from being shifted to the congestion state, and a controller embodying the method.

2. Description of the Prior Art

Referring to FIG. 1, there is shown an example of a packet switching network, which includes packet switching nodes 12 directly or indirectly connected to various sorts of medium terminals 11 such as data terminals, voice terminals, picture terminals and so on, for generally controlling the respective terminals and for converting communication data geneated at these terminals into data having a packet format to be transferred and also converting packet format input data received through the packet switching network from destination terminals, into data having such a format that the data received terminal can reproduce, network controllers 13 disposed within the respective packet switching nodes 12 for controlling mainly network control between the packet switching network and the respective packet switching nodes on the basis of a calling data sent from the terminals 11, subscriber lines 14 connected between the terminals 11 and the respective packet switching nodes 12, trunk lines 15 connected between the packet switching nodes 12, terminal interfaces 17 connected between the terminals 11 and the packet switching nodes 12 for providing a calling-data informing function when the terminal 11 is not provided with the calling-data informing function to the assocaited network controller 13, packets 16 being transferred on the trunk lines 15 being shown in a model form.

Assume now that it becomes necessary to transfer a communication data from one terminal to another. Then the terminals 11 and the packet switching nodes 12 execute the sending or transfer operation of necessary data in such a manner as to be explained.

(1) A call demander terminal first sends a calling data including the address of a destination terminal and the address of its own terminal to the associated packet switching node connected to its own terminal (more accurately, to the network controller 13 provided in the associated packet switching node). For a terminal not provided with the calling-data informing function to the associated network controller 13, the terminal sends the calling data through the terminal interface 17 to the associated network controller 13.

(2) The packet switching node (the network controller 13) having received the calling data in this manner, selects, on the basis of the calling data, a route by which the communication data of the terminal in question is to be transferred and transfers the calling data in a packet format to the packet switching node which is in the selected route and which is adjacent to its own node.

(3) The adjacent packet switching node (network controller 13) having received the calling data and the subsequent packet switching nodes, similarly select the next route and eventually transfer the calling data in the packet format to the packet switching node to which the destination terminal is connected.

(4) The packet switching node having the destination terminal connected thereto, calls the destination terminal, confirms that the destination terminal is in its answerable state and then returns a call setting completion data of the packet format through the same route back to the caller packet switching node.

(5) The caller packet switching node, when having received the call setting completion data, informs the caller terminal of the call-setting completion data.

Through the above series of processings, the calling operation has been completed. Under this condition, the route secured in the aforementioned manner is maintained until any one of the terminals logically connected to each other issues a disconnection request. On the maintained route, transaction of the communication data between the terminals is carried out in the form of the packet 16.

With such a packet switching network that transmits communication data in the packet form, packets themselves are asynchronously transmitted and reach the respective target terminals through various routes. For this reason, it sometimes occurs that packets are convergedly sent to the particular packet switching node or to the particular trunk line, that is, a so-called traffic congestion takes place.

For the purpose of avoiding such a traffic congestion, a buffer having a suitable capacity is usually provided within each of the packet switching nodes so that the associated terminal is connected through the buffer to the associated trunk line.

The use of the buffer, however, has also involved a new disadvantage of "packet transmission delay". The packet transmission delay results from the fact that the packet must be transmitted through the buffers to the target terminal. Such transmission delay is not so important when the packet switching node is connected with a terminal requiring a relatively low transfer rate of communication data such as a data terminal, but cannot be made negigible when the packet switching node is connected with such a terminal having strong real time data as a voice terminal or with such a terminal having a wide range of data largely changing in quantity as a picture terminal.

Under such circumstances, there has been recently suggested a technique of restricting the calling operation from terminals to avoid the traffic congestion and put to practical use.

Shown in FIG. 2 is an internal configuration of the network controller of the packet switching node based on such a calling restricting system and convetionally employed in a packet switching network. As shown in FIG. 2, the network controller 13 comprises a calling protocol analyzer 1, a network administrator 2 and a route decider 3. The terminal 11 is connected to the calling protocol analyzer 1.

In the network controller 13, the address data of the destination terminal contained in a calling data issued from the terminal 11 is analyzed at the calling protocol analyzer 1 which in turn informs the route decicer 3 of the analized address contents.

The route decider 3 decides a route, i.e., the trunk line or lines of the route leading to the designated destination terminal on the basis of the informed address data contents and transfers a call through the calling protocol analyzer 1 to a packet switching node provided in the decided route and adjacent to its own packet switching node. At this time, when the network administrator 2 already informs the route decider 3 of a data indicative of occurrence of a trouble in the trunk lines of the decided route or a data indicative of occurrence of a congestion on the trunk lines, the route decider 3 refuses reception of a call from the terminal 11.

With such a packet switching network, when a trouble or a congestion takes place on one of the trunk lines, the network controller 13 automatically restricts the call using the trouble or congestion trunk line. For example, when a congestion occurs on the trunk line, the congestion is prevented by means of the network controller 13 from becoming more excessive. In other words, even when a congestion takes place, it can be removed with relative ease.

This calling restricting method, however, can restrict the calling operation through the above network controller 13 only when a trouble occurs on the trunk lines of the every time decided route or only when a congestion actually takes place. In other words, if a congestion does not actually take place, then the the network controller 13 will unconditionally accept the call even under such a condition that the trunk line is about to be put into its congestion state. Under such an immediately-before-congestion state, when the network controller 13 accepts a call from a voice or picture terminal having a large quantity of communication data output, the trunk line is put into the congestion state with a high possibility and thus it becomes difficult to ensure a stable packet transaction with a transmission quality demanded by the terminal.

SUMMARY OF THE INVENTION

In view of such circumstances, it is an object of the present invention to provide a call restricting method in a packet switching network and a network controller having a call restricting function, in which a call can be restricted by suitably judging whether or not packet communication is possible with a transmission quality demanded by each terminal, regardless of the sort or attribute of a terminal connected to the packet switching network or the state of a trunk line of a route decided every time.

In accordance with an aspect of the present invention, the above object is attained by arranging the invention so that each call origination terminal informs an associated one of the packet switching nodes connected with the call origination terminal of traffic parameters of its own terminal indicative of a traffic line application state or a data designating the traffic parameters together with the calling data, the associated packet switching node when informed of the traffic parameters and calling data estimates a line quality of the trunk line determined based on the calling data when the new call origination terminal is also added (multiplexed), on the basis of a trunk rate (whose value is previously known for each route) of the trunk line of a route decided according to the calling data, traffic parameters informed from terminals using the trunk line on a multiplex basis at this time and the traffic parameters informed from the call origination terminal, and accept the calling data from the call origination terminal only when the estimated line quality is maintained to be higher than a predetermined level that can satisfy transmission quality conditions demanded by the terminals using the trunk line.

The traffic parameters informed from the terminal or terminals are considered to include a value indicative of an average transfer rate of the communication data of the call origination terminal, a value indicative of a maximum transfer rate of the communication data of the call sender terminal, a value indicative of a quantity of data in the terminal communication data transferred during a predetermined time, a data (which can be expressed, for example, by a value obtained by dividing the value of the maximum transfer rate of the communication data of the terminal by the value of the average transfer rate of the communication data) indicative of a size of bursting property of the terminal communication data, and so on.

For example, when the traffic parameters informed from the call origination terminal include the value indicative of the average transfer rate of the communication data and the data indicative of the size of bursting property of the communication data, the associated packet switching node determines a line quality (communication quality) of the determined trunk line when terminals use the determined trunk line on a multiplex basis, on the basis of three values of a total average transfer rate sum corresponding to an addition of a sum of the communication data average transfer rates of the terminals using the determined trunk line on the multiplex basis and the communication data average transfer rate of the call origination terminal, a data indicative of a new size of bursting property when the data indicative of the size of bursting property of the call origination terminal is added to a data indicative of a size of bursting property of the terminals using the determined trunk line, and the trunk rate of the determined trunk line, and accepts the calling data from the call origination terminal only when the determined line quality is maintained to be higher than the predetermined level.

When the traffic parameters informed from the call origination terminal include the value indicative of the average transfer rate of the communication data and the data indicative of the maximum transfer rate of the comuniction data, the associated packet switching node calculates a total average transfer rate sum corresponding to an addition of a sum of the communication data average transfer rates of the terminals using the determined trunk line on the multiplex basis and also calculates a total difference sum of a sum of differences between the communication data maximum and average transfer rates of the terminals using the determined trunk line on the multiplex basis and a subtraction of the communication data average transfer rate from the communication data maximum transfer rate for the call origination terminal, and estimates a line quality of the determined trunk line on the basis of the total average transfer rate sum and the total difference sum thus calculated. In this case, the total average transfer rate sum is related directly to the line capacity of the trunk line, and thus for the purpose of satisfying the transmission quality conditions demanded by the terminals, at least the total average transfer rate sum must be smaller than the trunk rate of the trunk line. This explanation is also applied for the above case using the average transfer rate and the data indicative of the size of bursting property as the traffic parameters, as a matter of course. Further, since the total difference sum implies the possibility that the communication data quantities of the respective terminals may exceed the line capacity of the trunk line in question, a predetermined value based on the desired lowest line quantity of the trunk line can be set for the total difference sum. Accordingly, in this case, the above packet switching node is arranged to determine whether or not to accept a call from the new call origination terminal on the logical "AND" condition that the total average transfer rate sum is smaller than the trunk rate of the trunk line in question and the total difference sum is smaller than the predetermined value.

Furthermore, when the traffic parameters informed from the call origination terminal include the value indicative of the average transfer rate of the communication data and the value indicative of a quantity of data in the terminal communication data transferred during a predetermined time, the associated packet switching node calculates a total average transfer rate sum corresponding to an addition of a sum of the communication data average transfer rates of the terminals using the determined trunk line on the multiplex basis and also calculates a total excessive data quantity sum of a sum of quantities of data transferred at a rate exceeding the average transfer rate during a predetermined time with respect to the terminals using the determined trunk line on the multiplex basis and the quantity of data transferred at a rate exceeding the average transfer rate during the predetermined time with respect to the call origination terminal, and estimates a line quality of the determined trunk line on the basis of the total excessive average transfer rate sum and the total data quantity sum. Even in this case, in order to satisfy the transmission quality conditions demanded by the terminals, it is necessary for at least the total excessive data quantity sum to be smaller than the trunk rate. Further, the total excessive data quantity sum implies the degree to which the communication data quanities of the terminals actually exceed the line capacity of the trunk line in question. A predetermined value based on the desired lowest line quantity of the trunk line can also be set for the total excessive data quantity sum. Accordingly, in this case, the associated packet switching node is arranged to determine whether or not to accept a call from the new call origination terminal on the logical "AND" condition that the total average transfer rate sum is smaller than the trunk rate of the trunk line and that the total excessive data quantity sum is smaller than the predetermined value.

In any case, when the call restriction is carried out in such a manner as mentioned above, the trunk lines can be efficiently used under the conditions that can satisfy the transmission quantity conditions demanded by the terminals and also reflect the application state of the trunk line with respect to all the terminals including the new call origination terminal, that is, in such a manner that, when the new call origination terminal may cause a congestion, only the call is reliably restricted without involving unnecessary restriction of any other call.

Of course, the traffic parameters may be set to be informed (declared) from the respective terminals directly to the associated packet switching nodes. Or there may be provided a suitable table between the terminal and the associated packet switching node (or within the packet switching node), in which various sorts of traffic parameters are previsously stored, and ones of the traffic parameters corresponding to the contents of the call origination terminal may be read out from the table each time. In this case, the read-out traffic parameters are informed (declared) so-called indirectly to the associated packet switching node.

DESCRIPTION OF THE PREFERRED EMBODIMENTS

Figure 3:
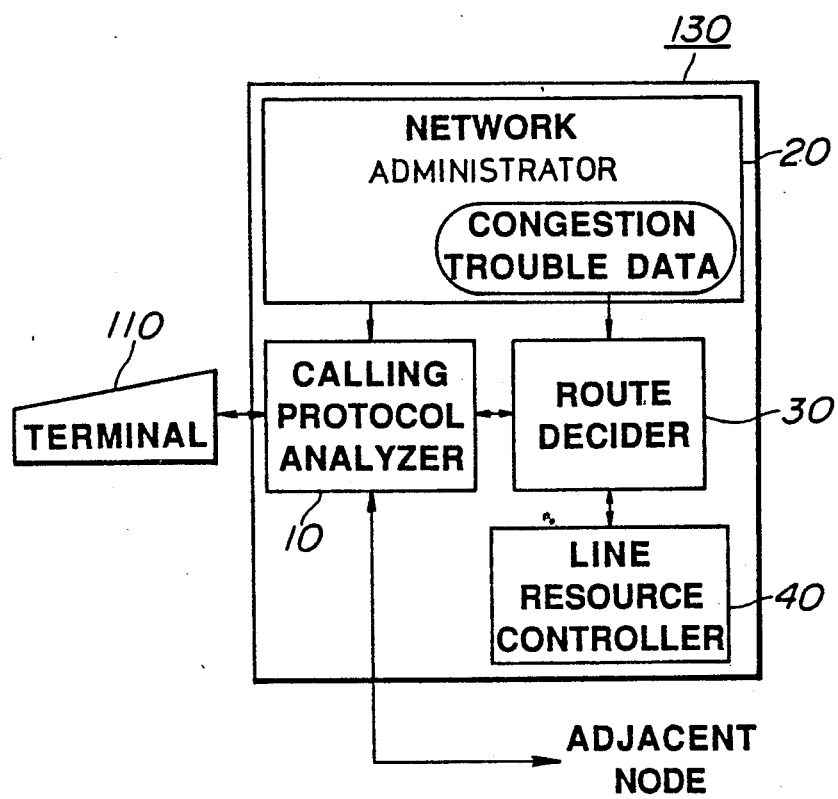
FIG. 3 is a block diagram showing an embodiment of a network controller to which a call restricting method in accordance with the present invention is applied.

Referring now to FIG. 3, there is shown an embodiment of a network controller 130 used in a packet switching node, to which controller a call restricting method in accordance with the present invention is applied.

Figure 1:
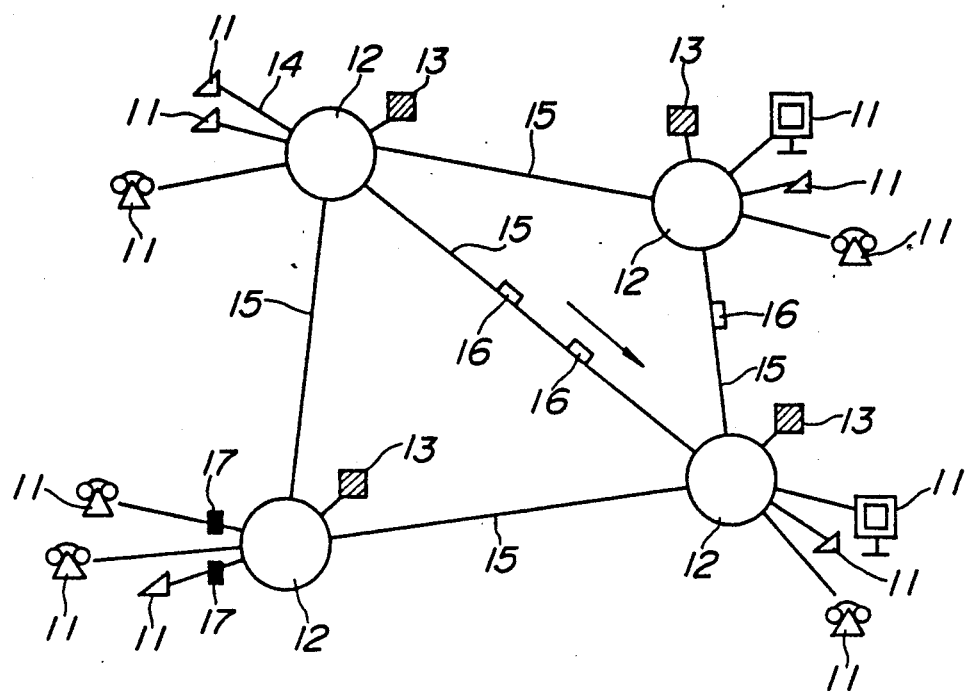
FIG. 1 is a block diagram showing, in a model form, the idea of a packet switching network.

The network controller 130 of FIG. 3 is basically disposed within each of the packet switching nodes 12 used in the packet switching network of FIG. 1, and functions to perform a logical interconnection between a call origination terminal, a destination terminal and a trunk line according to the destination of communication data demanded by the caller terminal to realize data communication between the terminals.

In the present embodiment, a terminal 110 informs the associated packet switching node of such traffic parameters indicative of the application state of a trunk line as the average transfer rate of communication data from its own terminal (that is, terminal 110), a data indicative of the size of the bursting property of the same communication data, and so on, in addition to the calling data containing the address data of the destination terminal and the address data of its own terminal. In this connection, the data indicative of the size of the bursting property can be defined as a value obtained by dividing the value of the maximum data transfer rate of the terminal in question by the value of the average transfer rate.

Figure 2:
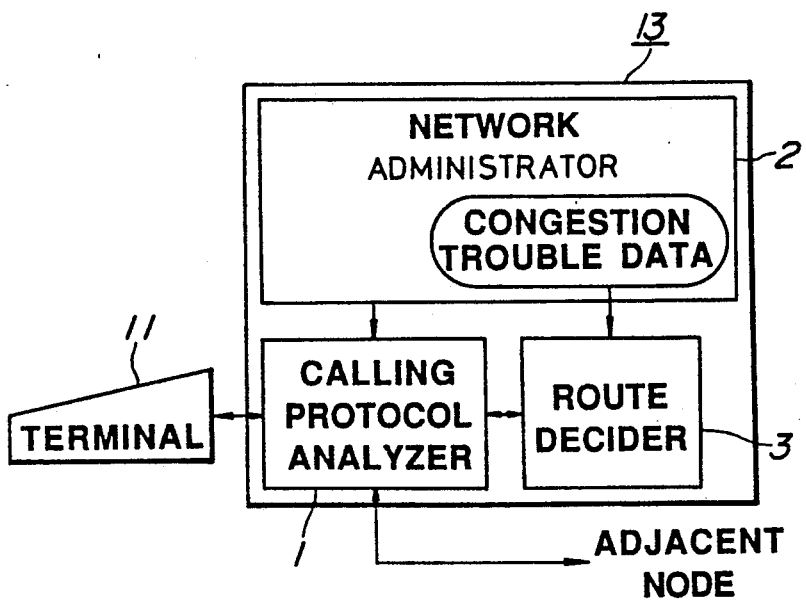
FIG. 2 is a block diagram showing an example of a network controller so far employed in a packet switching node in the packet switching network.

The network controller 130 shown in FIG. 3 is different from the prior art network controller 13 (refer to FIG. 2) in that a line resource controller 40 is newly added.

More specifically, with the network controller 130, the address data of the destination terminal, the address data of its own terminal, the average transfer rate of communication data of its own terminal, and the data indicative of the size of the bursting property of the same communication data are analyzed at a calling protocol analyzer 10 which in turn informs a route decider 30 of the analyzed contents.

The route decider 30, when informed of the analyzed contents, not only selects a suitable one of the trunk lines for the route as in the prior art but also determines whether or not to accept a call from the latest-call origination terminal 110 in cooporation with the line resource controller 40 (to be detailed later).

The line resource controller 40 estimates the line quality of a trunk line designated by the identification data (which will be sometimes referred to as route No. or outgoing route No., hereinafter) of the trunk line informed from the route decider 30 when a new call origination terminal is also added, on the basis of the trunk rate of the designated trunk line, traffic parameters of terminals using the trunk line informed from the route decider 30, i.e., the average transfer rate of the communication data and data indicative of the size of bursting property of the same communication data, and the average transfer rate of communication data of the new call origination terminal (terminal 110) newly informed from the route decider 30 and data indicative of the size of bursting property of the same terminal data; and instructs the route decider 30 to accept the call from the call origination terminal (terminal 110) only when the estimated line quality is maintained to be higher than a predetermined level which can satisfy the transmission quality conditions demanded by the respective terminals using the same trunk line.

Figure 4:
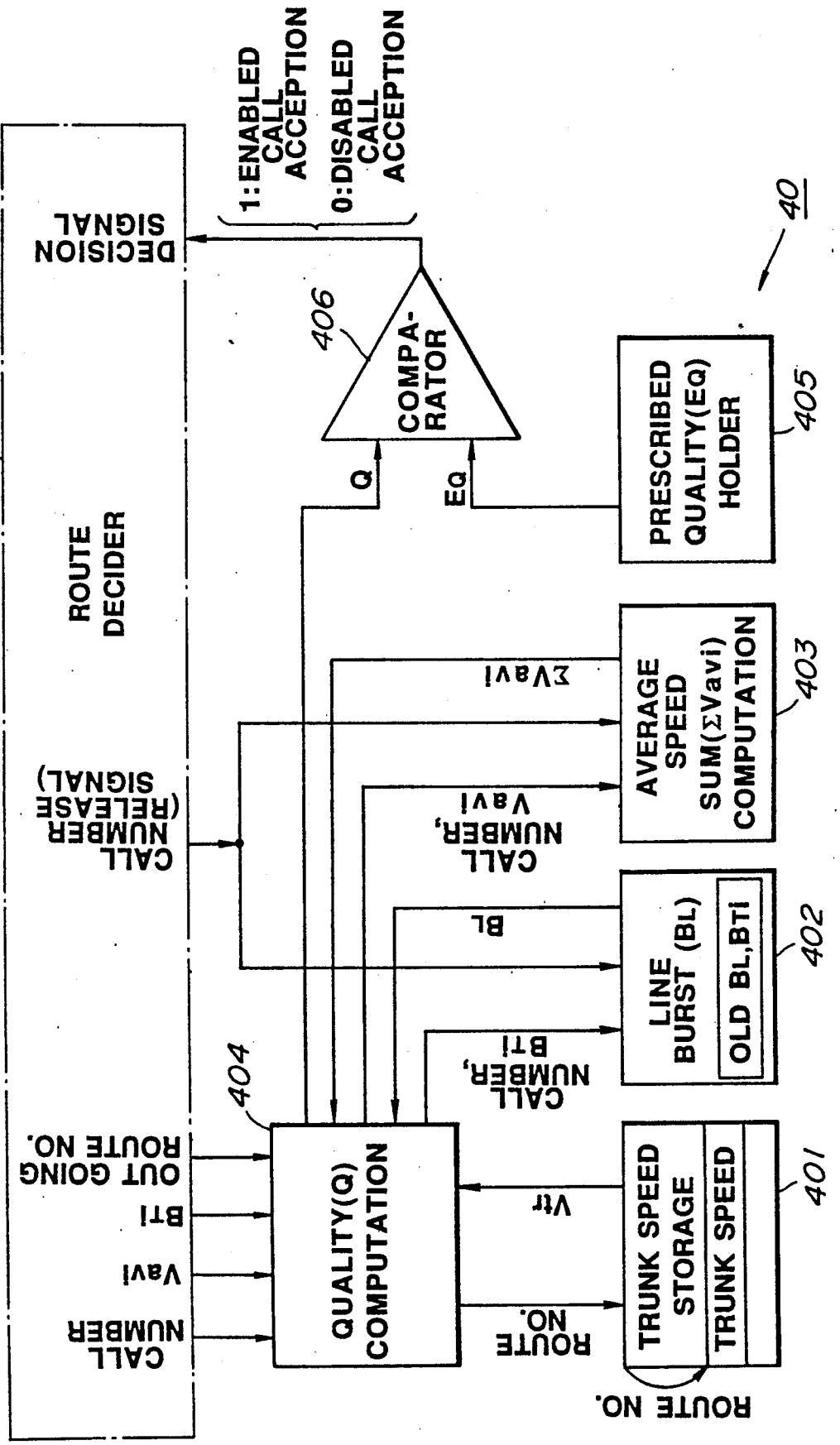
FIG. 4 is a block diagram showing an exemplary specific arrangement of a line resource controller used in FIG. 3.
Figure 5:
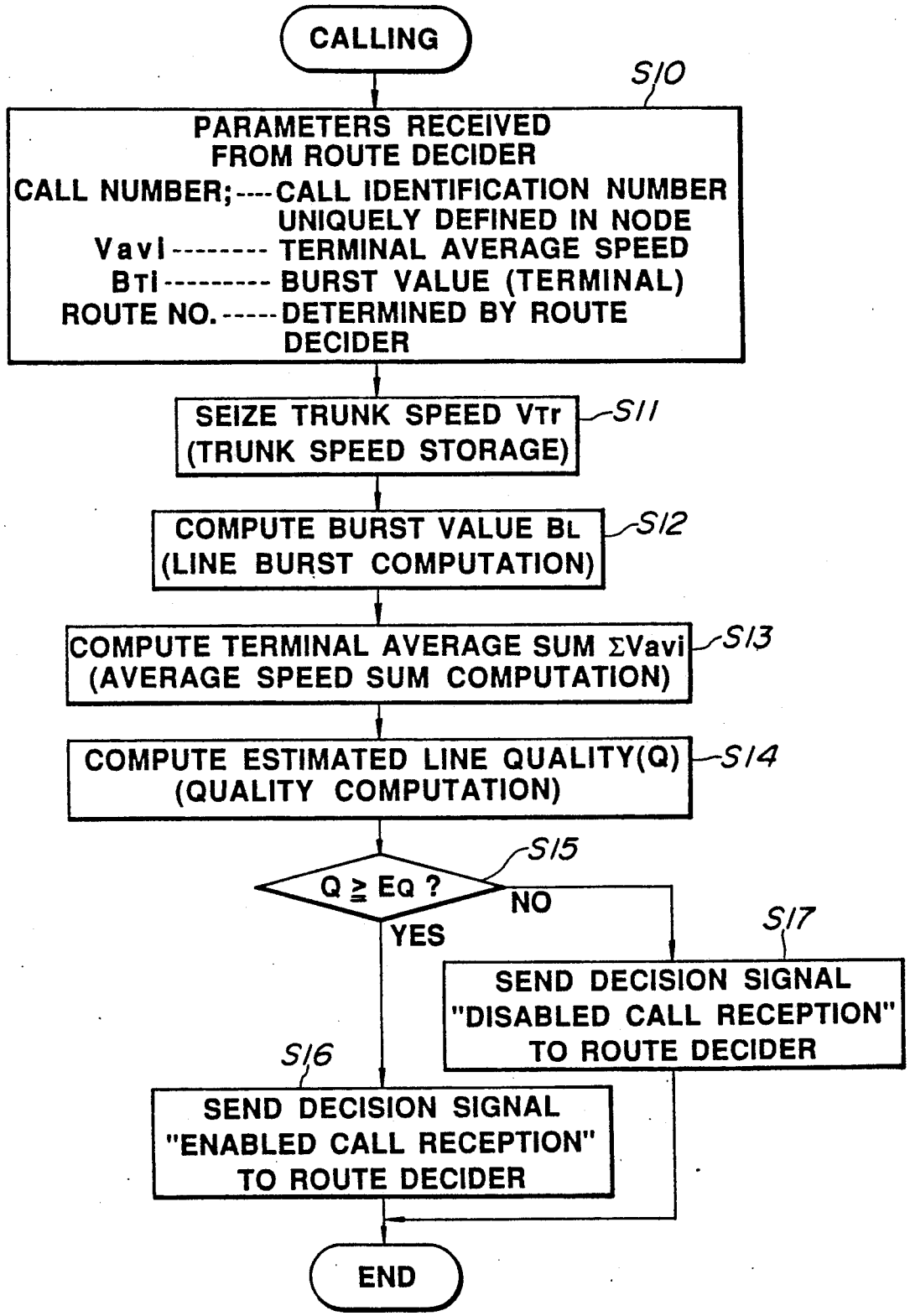
FIG. 5 is a flowchart for exaplining the operation of the line resource controller of FIG. 4 when in its calling mode.
Figure 6:
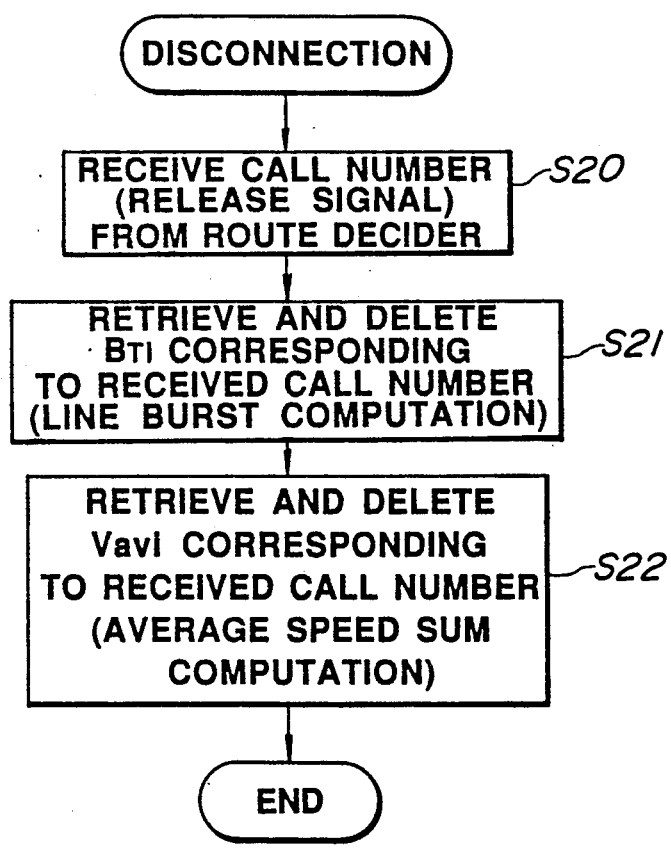
FIG. 6 is a flowchart for exaplining the operation of the line resource controller of FIG. 4 when in its disconnection mode.

FIG. 4 shows an exemplary specific arrnagement of the line resource controller 40 used in FIG. 3, while FIGS. 5 and 6 are flow charts for explaining the operation of the line resource controller 40. Explanation will be made in more detail as to the arrangement and operation of the line resource controller 40 by referring to FIGS. 4 to 6.

The route decider 30, as shown in FIG. 4, first informs the line resource controller 40 of a call reference number (hereinafter referred to as the call number) as a terminal identification data of the node in question corresponding to the address of the call origination terminal itself, a communication data average transfer rate Vavi of the same terminal, a data BTi indicatiave of the size of bursting property of the communication data of the same terminal and the decided outgoing route No. (route No.) each time the route decider 30 receives a call request from a terminal; and when one of the terminal in communication finishes its communication, the route decider 30 again informs the line resource controller 40 of the call number of the communication-finished terminal as a release signal. The line resource controller 40, when receiving these data, returns to the route decider 30 a decision signal for judgement of whether or not the route decider 30 accepts the call from the call origination terminal.

The line resource controller 40 comprises the following components (a) to (f) as shown in FIG. 4, that is, (a) a trunk rate storage 401 in which truck rates Vtr for trunk lines connected to the node in question are previously stored and which functions to select (seize) and output one of the trunk rates Vtr corresponding to the route No. informed from the route decider 30, (b) a line burst computing part 402 which receives the data BTi indicative of the size of the bursting property together with the call number among the traffic parameters informed from the route decider 30 and computes a value BL indicative of a new size of bursting property of the decided trunk line when the communication data of the call origination terminal is multiplexed on the trunk line on the basis of the data so far informed from the route decider 30, (c) an average rate sum computing part 403 which sequentially receives a value Vavi indicative of the average transfer rate together with the call number among the traffic parameters informed from the route decider 30 and which computes a value ΣVavi indicative of a sum of such average transfer rate values Vavi on the decided trunk line when the communication data of the call origination terminal is multiplexed on the decided trunk line on the basis of the values so far informed from the route decider 30, (d) a quality computing part 404 which receives the call number, the average transfer rate Vari, the data BTi indicative of the size bursting propperty and the route No. informed from the route decider 30, applies these data to the trank rate storage 401, line burst computing part 402 and average rate sum computing part 403, and predictively computes a line quality Q of the trunk line in question when the communication data of the call origination terminal is multiplexed on the trunk line on the basis of data Vtr, BL and ΣVari received from the parts 401 to 403 as their outputs, (e) a prescribed quality holder 405 in which a limit value of the line quality Q to be computed and estimated satisfying the transmission quality conditions demanded by the respective terminals utilizing the trunk line in question is previously registered and held as a prescribed quality EQ, and (f) a comparator 406 which compares the line quality Q predictively computed at the quality computing part 404 with the value EQ held in the prescribed quality holder 405 and which outputs the decision signal of logical value "1" indicative of "enabled call acception" when the predictively computed line quality Q is higher than the held value EQ and otherwise outputs the decision signal of logical value "0" indicative of "disabled call acception" to the route decider 30.

The above decision signal is generated based on the cooperative operation of these components 401 to 406.

Explanation will first be made as to the operation of the line resource controller 40 in its calling mode where the decision signal is to be generated.

Assume now that the terminal 110 actually issues a call request and the network controller 130 receives the call data and the aforementioned traffic parameters of the terminal 110 itself. Then the line resource controller 40 first receives from the route decider 30 such parameters as the call number, the average transfer rate Vavi, the data BTi indicative of the size of bursting property and the route No. (refer to step S10 in FIG. 5); and then executes its preliminary computing operation including the following operations (1) to (3) to determine the line quality of the trunk line in question. That is, (1) The line resource controller 40 seizes one of the trunk rates Vtr previously stored in the trunk rate storage 401 and corresponding to the route No. (refer to step S11 in FIG. 5).

(2) The controller 40 computes, at the line burst computing part 402, a value BL indicative of a new size of bursting property of the route (trunk line) including the terminal 110 (refer to step S12 in FIG. 5).

(3) The controller 40 computes, at the average rate sum computing part 403, a sum ΣVavi of average transfer rate values of the communication data of the respective terminals of the route (trunk line) including the terminal 110 (refer to step S13 in FIG. 5).

The value BL indicative of the size of the new bursting property after the trunk line is subjected to the multiplexing operation can be determined as a function with respect to the data (which will be referred to merely as the burst data, hereinafter) BTi indicative of the size of bursting property informed from the respective terminals, and can be expressed in the form of the following expression (1) when the new call origination terminal 110 is also added, where subscript i in the expression is denoted by i=1 to n.

$$BL = B(BT1, BT2, BT3, \ldots BTn) \quad (1)$$

In more detail, when the burst data BTi of the respective terminals are defined respectively as a value obtained by dividing the maximum value of the data transfer rate of each terminal by the average transfer rate of the same transfer data as already explained earlier, the value BL can be also defined as a value specified according to the multiplexing number of the trunk line in question taking into consideration the value (BT1, BT2, BT3, ... BTn) obtained by dividing the maximum value of the data transfer rate of each terminal by the average transfer rate of the same transfer data. Further, when the burst data BTi informed from each terminal is set to include, for example, "a value indicative of the maximum sustained time duing which the transfer rate of communication data exceeds its average transfer rate" in addition to "the value obtained by diving the maximum transfer rate by the average transfer rate", the burst data BTi as the traffic parameter can be further enhanced in reliability.

The above sum ΣVavi of average transfer rate values after the multiplexing operation is determined as a mere addition of average transfer rate value Vavi informed from the respective terminals and, can be expressed by the following expression (2) when the new call origination terminal 110 is also added, where subscript i is denoted by i=1.

$$\sum_{i=1}^{n} Vavi \quad (2)$$

After finishing its preliminary computing operation in this manner, the line resource controller 40 next computes and predicts, at the quality computing part 404, the line quality Q of the route (trunk line) in question when the communication data of the call origination terminal (terminal 110) is multiplexed on the trunk line on the basis of the trunk rate Vtr seized at the trunk rate storage 401, the burst representation value BL computed at the line burst computing part 402 and the sum ΣVavi of the average transfer rates computed at the average rate sum computing part 403 (step S14 in FIG. 5). The predicted line quality Q is defined by the following relationship (3) using these values.

$$Q = F\left(\sum_{i=1}^{n} Vavi, BL, Vtr\right) \quad (3)$$

The values of Q which can be experimentally estimated may be previously registered in a single table or a plurality of tables so that these tables can be searched on the basis of these values.

The line resource controller 40, after having predictively computed the line quality Q, next compares at the comparator 406 the obtained value of Q with the prescribed quality EQ held in the prescribed quality holder 405 (refer to step S15 in FIG. 5). As a result of the comparision, if the value of the estimated line quality Q is maintained to be higher than the prescribed quality value EQ, then the line resource controller 40 outputs the decision signal of logical value "1" indicative of "enabled call accepetion" to the route decider 30 (see step S16 in FIG. 5); while, otherwise, that is, if the estimated line quality Q does not reach the prescribed quality EQ, then the controller 40 outputs the decision signal of logical value "0" indicative of "disabled call acception" to the route decider 30 (see step S17 in FIG. 5). At this stage, the calling operation (calling mode) of the line resource controller 40 has been completed. At the end of the calling operation, the line resource controller 40, on the basis of the above decision, temporarily holds the burst data BTi and the average transfer rate Vavi corresponding to the call number respectively in the line burst computing part 402 and in the average rate sum computing part 403 with respect to the terminal whose call is to be accepted while it discards these data BTi and Vavi corresponding to the call number of the terminal whose call is to be rejected.

When the line resource controller 40 outputs the decision signal of logical value "1" indicative of "enabled call acception" to the route decider 30 on the basis of the above decision operation, the route decider 30 in turn informs the calling protocol analyzer 10 (see FIG. 3) of a call permission and an outgoing route No. (outgoing trunk line identifier) for data transfer.

The calling protocol analyzer 10, when receiving such information, transfers the calling data of the terminal 110 as the call demander to the adjacent node of the trunk line in question and the subsequent processing is substantially the same as in the prior art. That is, the calling operation is established through the suitable selection of the route at the respective packet switching nodes, after which data transfer can be realized between the calling terminal and the destination terminal. Further, a congestion or a trouble occurred within the network is also subjected to the call restricting operation based on data from the network controller 20 as in the prior art.

Explanation will next be made as to the operation of the line resource controller 40 in its communication disconnection mode.

The terminal 110, when finishing the data transfer to the destination terminal, sends a disconnection signal to the calling protocol analyzer 10 (see FIG. 3) of the packet switching node connected to its own terminal.

The calling protocol analyzer 10, when receiving the disconnection signal from the terminal 110, informs the route decider 30 of the data transfer completion and also transfer the disconnection data to the adjacent node. The disconnection data is transferred via the former route through which the terminal has so far communicated with the destination terminal, to the former communication destination terminal, whereby the call on the packet switching network is released.

At this stage, in each of the related packet switching nodes, the route decider 30, when receiving an information indicative of the completion of the data transfer, again informs the associated line resource controller 40 of the call number of the terminal in question as a release signal, in such a manner as mentioned above.

The line resource controller 40, when accepting the call number as the release signal (see step S20 in FIG. 6), retrieves and deletes at the line burst computing part 402 the burst data BTi of the terminal corresponding to the received call number (see step S21 in FIG. 6), and similarly retrieves and deletes the average transfer rate Vavi of the terminal corresponding to the received call number (see step S22 in FIG. 6), thus completing the operation. In this way, when the traffic parameters of one of the terminals which has finished its communication are erased from the computing parts 402 and 403, the line quality can be estimated accurately according to the every time application state of the trunk line and therefore the decision signal can be output with a higher reliability.

As has been explained in the foregoing, in the present embodiment, in the calling mode, such traffic parameters inherent to the respective terminals as the burst data and the average transfer rate are informed to the network side together with the calling data, whereas the network side predictively computes the line quality of the trunk line each time decided with use of these parameters and accepts the call of the call origination terminal only when the predicted line quality satisfies the prescribed line quality condition. As a result, the call restriction operation can be realized effectively and efficiently according to the every time application state of the trunk line in question.

Figure 7:
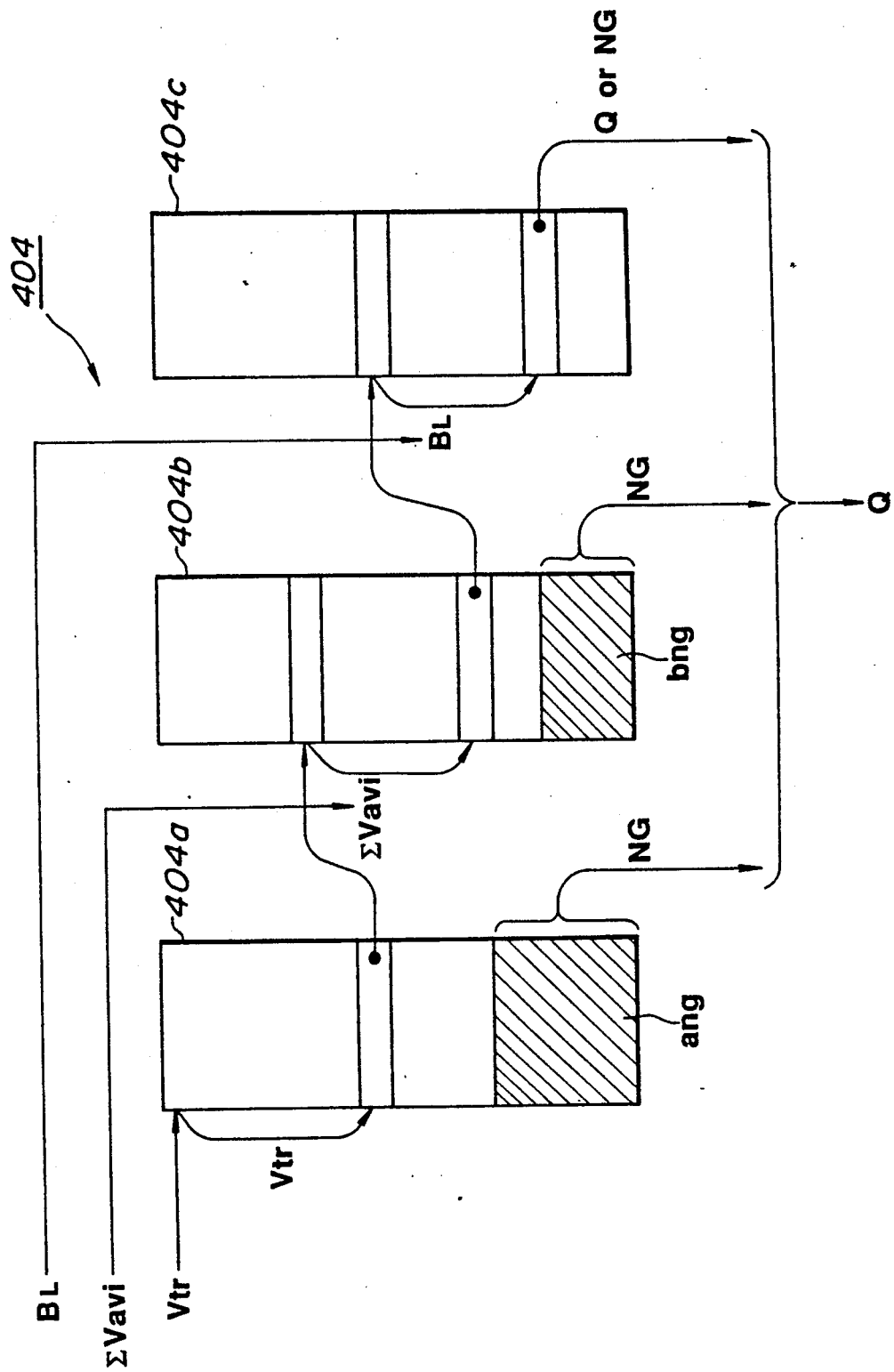
FIG. 7 is a block diagram showing an exemplary arrangement of a quality computing part used in FIG. 4.

The details of the line resource controller 40 may be realized in various ways, but when it is desired to realize, in particular, the quality computing part 404 on such a table searching basis as explained above, such an arrangement of the part 404 as shown, for instance, in FIG. 7 is effective.

In the latter case, the quality computing part 404, as shown in FIG. 7, comprises a first data table 404a to be subjected to a searching operation on the basis of the trunk speed Vtr as the output of the trunk rate storage 401, a second data table 404b to be subjected to a searching operation on the basis of the sum $\Sigma$Vavi of average transfer rate values as the output of the average rate sum computing part 403, and a third data table 404c to be subjected to a searching operation on the basis of the burst representation value BL as the output of the line burst computing part 402. The third data table 404c of the last stage outputs its searched output as the estimated line quality Q. The first and second data tables 404a and 404b in the quality computing part 404 are provided respectively with an NG area ang and an NG area bng (both areas being denoted by hatched areas) so that, when the searched data is in the NG area ang or bng, the area unconditionally outputs the decision signal NG indicative of "disabled call acception".

The contents of the decision signal NG are arbitrary and the decision signal of logical value "0" may be output directly to the route decider 30. Or when such an arrangement as shown in FIG. 4 is utilized as it is for the decision signal NG, the signal NG may be previously set at a value which always does not satisfy the prescribed quality value EQ condition.

The array of the first to third data table is not restricted to the specific example shown in FIG. 7, and arbitrarily modified so long as a value from which the every time line quality of the trunk line in question can be suitably estimated, can be obtained from the last-stage of data table as the estimated quality Q.

Figure 8:
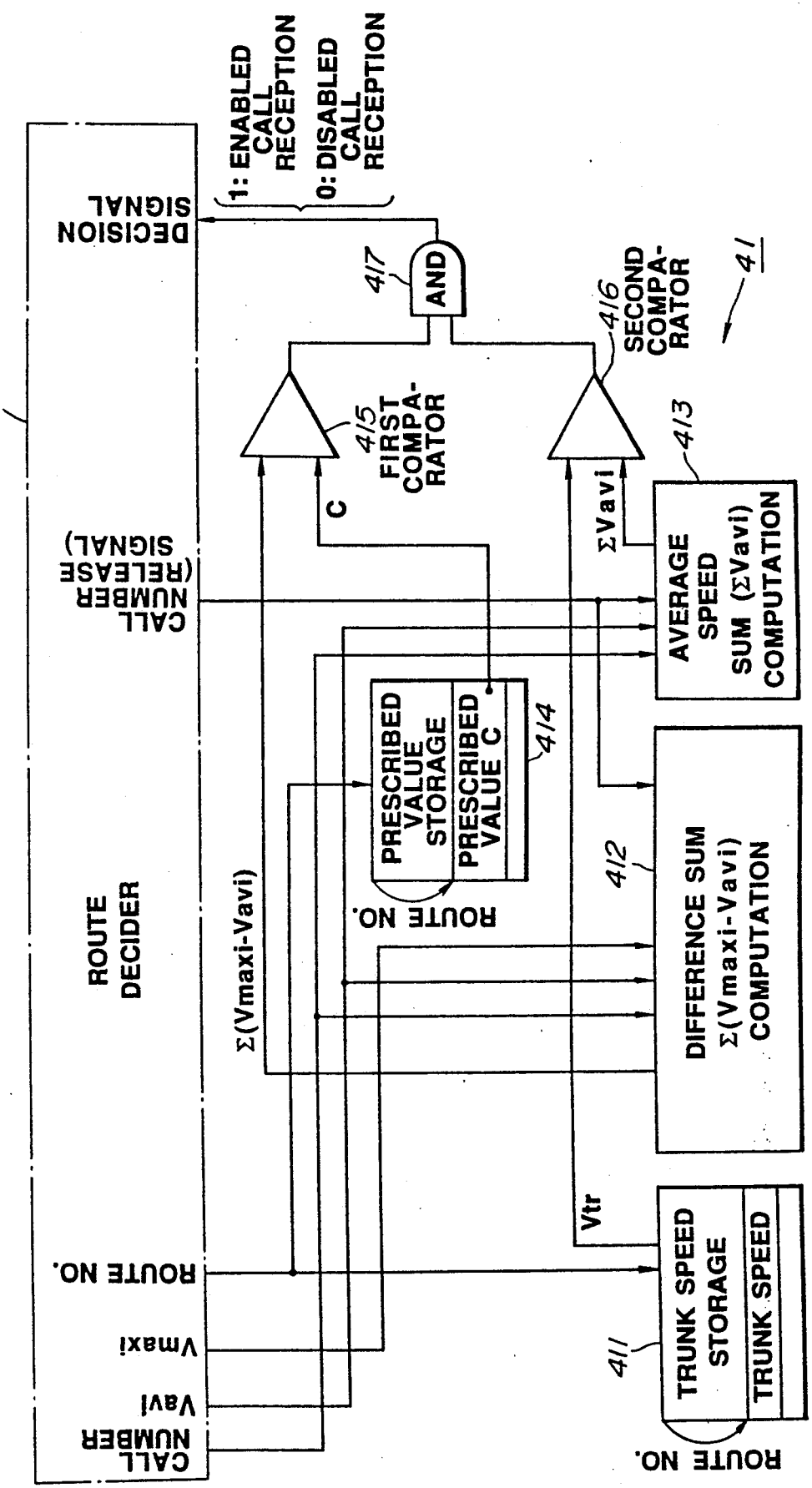
FIG. 8 is a block diagram showing an exemplary specific arrangement of a line resource controller used in another embodiment of the network controller to which the call restricting method of the present invention is applied.

There is shown in FIG. 8 an exemplary specific arrangement of a line resource controller used in another embodiment of the network controller to which the call restricting method of the present invention is applied.

In the embodiment of FIG. 8, the terminal 110, when demanding a call of the associated packet switching node, informs the associate packet switching node of the average transfer rate of communication data of its own terminal and the maximum transfer rate of the same communication data together with the calling data. The values of the average transfer rate and the maximum transfer rate are analyzed together with the calling data at the calling protocol analyzer of the network controller, and the analyzed contents are informed to a route decider 31.

The route decider 31 has basically the same function as the route decider 30 shown in FIG. 3 or 4. In the present embodiment shown in FIG. 8, however, the maximum transfer rate Vmax in place of the burst data BTi is informed from the route decider 31 to a line resource controller 41.

The line resource controller 41 in the present embodiment, as shown in FIG. 8, comprises components (a) to (g), that is, (a) a trunk rate storage 411 in which trunk rates Vtr for trunk lines connected to the node in question are previously stored and which functions to select (seize) and output one of the trunk rates Vtr corresponding to the route No. informed from the route decider 31, (b) a difference sum computing part 412 which receives a value Vmaxi indicative of the maximum transfer rate and a value Vavi indicative of the average transfer rate together with the call number among the traffic parameters informed from the route decider 31 and computes a sum $\Sigma$(Vmaxi−Vavi) of differences between the maximum and average transfer rates on the trunk line in the trunk line in question when the communication data of the call origination terminal is multiplexed on the trunk line on the basis of these values so far informed from the route decider 31, (c) an average rate sum computing part 413 which sequentially receives a value Vavi indicative of the average transfer rate together with the call number among the traffic parameters informed from the route decider 31 and which computes a value Σ Vavi indicative of a sum of such average transfer rate values Vavi on the decided trunk line when the communication data of the call origination terminal is multiplexed on the decided trunk line on the basis of the values so far informed from the route decider 31, (d) a prescribed value storage 414 in which a limit value of the sum Σ (Vmaxi−Vavi) of differences between the maximum and average transfer rates with respect to trunk lines connected to the node in question is previously stored or registered and which determines and outputs one of the limit values corresponding to the route No. informed from the route decider 31 as a prescribed value C, (e) a first comparator 415 which compares the sum Σ (Vmaxi−Vavi) of differences between the maximum and average transfer rates computed at the difference sum computing part 412 with the prescribed value C determined at the prescribed value storage 414 and which outputs a comparison signal of logical value "1" when the value of the Σ (Vmaxi−Vavi) is smaller than the prescriabed value C and otherwise outputs the comparison signal of logical value "0", (f) a second comparator 416 which compares the trunk rate value Vtr determined at the trunk rate storage 411 with the sum Σ Vavi of average transfer rate values computed at the average rate sum computing part 413 and which outputs a second comparison signal of logical value "1" when the sum Σ Vavi of average transfer rate values is smaller than the trunk rate value Vtr and otherwise outputs the second comparison signal of logical value "0", and (g) an AND circuit 417 which outputs a decision signal of logical value "1" indicative of "enabled call acception" to the route decider 31 when the comparison outputs of the first and second comparators 415 and 416 have both a logical value "1" and otherwise outputs the decision signal of logical value "0" indicative of "disabled call acception" to the route decider 31.

That is, the line resource controller 41 estimates the line quality of a trunk line designated by the route No. informed from the route decider 31 when the new call origination terminal is also added, on the basis of the trunk rate Vtr of the designated trunk line, traffic parameters of terminals using the trunk line informed from the route decider 31, i.e., the average transfer rate Vavi maximum transfer rate Vmaxi of the communication data, the average transfer rate Vavi and maximum transfer rate Vmaxi of communication data of a call origination terminal newly informed from the route decider 31; and instructs the route decier 31 to accept the call from the call origination terminal only when the estimated line quality can be maintained to be a predetermined level which can satisfy the transmission quality conditions demanded by the respective terminals using the same trunk line. The line resource controller 41, in particular, can output to the route decider 31 the decision signal of logical value "1" indicative of "enabled call acception" only under the conditions that the following relationships (4) and (5) are satisfied when the new call origination terminal is also added, where subscript i is denoted by i=1 to n.

$$\sum_{i=1}^{n} (Vmaxi - Vavi) < C \qquad (4)$$

$$\sum_{i=1}^{n} Vavi < Vtr \qquad (5)$$

Examination will be made as to how the call restricting operation be actually provided under what conditions, by referring to an actual specific example.

When the trunk rate Vtr of the decided trunk line is set to be 1.5 Mbps, the prescribed value C is set to be 2.3 Mbps, and further terminals based on multiplex communication are of a voice type having a maximum transfer rate of 64 kbps and an average transfer rate of 22.4 kbps; the above conditions of the relationships (4) and (5) can be rewritten as follows.

$$\Sigma (64 - 22.4) \text{ kbps} < 2.3 \text{ Mbps} \qquad (4)'$$

$$\Sigma 22.4 \text{ kbps} - 1.5 \text{ Mbps} \qquad (5)'$$

Accordingly, in this case, when the multiplexing number is 55, the line resource controller 41 (more precisely, the first comparator 415) provides the call restricting operation at least in accordance with the relationship (4)'.

Figure 9:
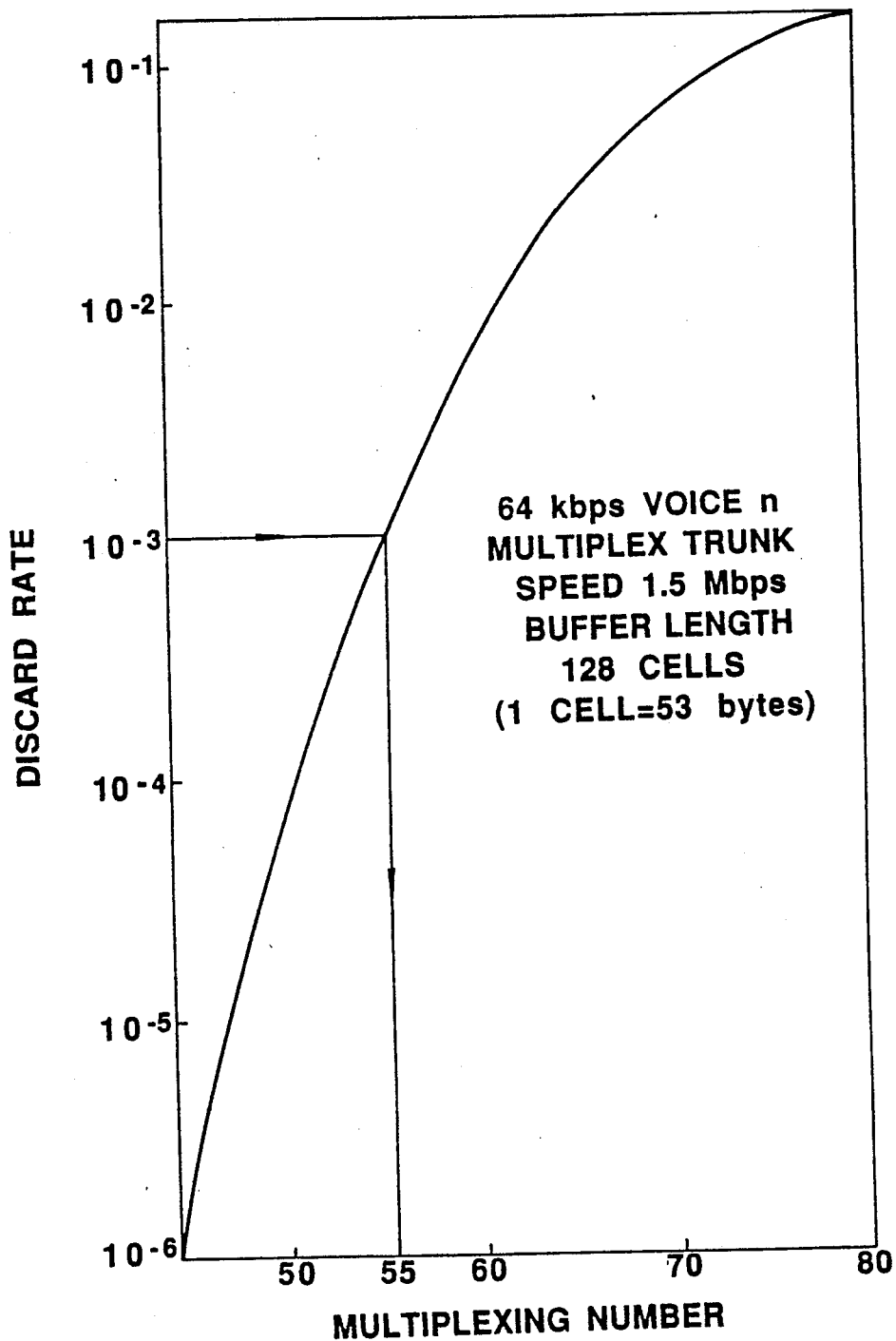
FIG. 9 is a graph showing an exemplary relationship between multiplexing number and discard rate to decide parameters to be used in the line resource controller shown in FIG. 8.

In this connection, the above value "2.3 Mpbs" for the prescribed value C and the value "55" for the multiplexing number are determined based on such a characteristic curve showing a relationship between multiplexing number and discard rate as exemplified in FIG. 9. That is, it will be seen from the characteristic curve of FIG. 9 that, in the case of n multiplexed voice of 64 kpbs for a trunk rate 1.5 Mbps, the multiplexing number for the optimum discard rate ($10^{-3}$) is "55". The above value "2.3 Mbps" for the prescribed value C was obtained by reversely calculating the relationship (4).

Figure 10:
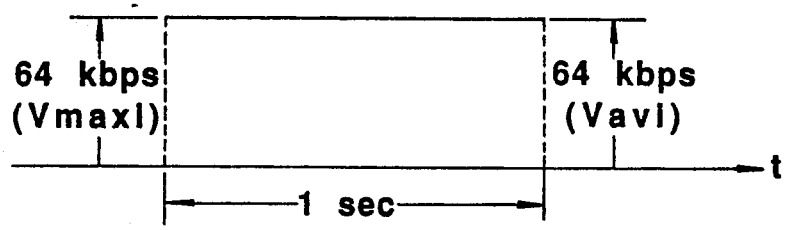
FIG. 10 is a timing chart showing, in a model form, the data transfer state of a communication data issued from a medium terminal when its maximum transfer rate is equal to its average transfer rate.

Another example will be examined when a 64 kbps terminal which is not restricted to a voice type is unrestrictedly multiplexed on the same trunk line as the above case. In this case, the maximum and average transfer rates Vmaxi and Vavi per unit time become equal as exemplified in FIG. 10 in its data transfer form. That is, $$Vmaxi = 64 \text{ kbps}$$

$$Vavi = 64 \text{ kbps}$$

Hence, the above conditions of the relationships (4) and (5) are rewritten as follows.

$$\Sigma (64 - 64) \text{ kbps} < 2.3 \text{ Mbps} \qquad (4)''$$

$$\Sigma 64 \text{ kbps} < 1.5 \text{ Mbps} \qquad (5)''$$

Thus, the multiplexing number is 23, the line resource controller 41 (more precisely, the second comparator 416) provides the call restricting operation at least in accordance with the condition (5)".

In this way, even in the present embodiment, the call restriction can be realized suitably according to the every time application state of the trunk line on the basis of the logical "AND" condition of the relationships (4) and (5). Further, the other operation of the line resource controller 41 in the present embodiment including disconnecting operation is substantially the same as that of the line resource controller 40 shown in FIG. 3 or 4, and thus explanation thereof is omitted.

In the case of the embodiment of FIG. 8, in the sum $\Sigma$ (Vmaxi−Vavi) of differences between the maximum and average transfer rates Vmaxi and Vavi, the average transfer rate Vavi reflects an actual transfer data amount but the maximum transfer rate Vmaxi is uniquely determined according to the characteristics of the respective terminals. Therefore, even when such restricting operation as mentioned above is provided, the embodiment of FIG. 8 may probably have an allowance of being capable of actually accepting an additional call.

In other words, when the embodiment is set to accept a call under such a condition that the sum $\Sigma$ (Vmaxi−Vavi) of differences between the maximum and average transfer rates does not exceed a predetermined value (refer to the equation (4)), the embodiment has a possibility of refusing a call, that is, of refusing a call more frequently than it needs, in spite of the fact that it can actually accept the call.

For the purpose of avoiding such a disadvantage, each of the terminals is designed to inform the associated packet switching node of, in place of the maximum transfer rate Vmaxi, a traffic value indicative of a quantity of data transferred from its own terminal during a predetermined time and also containing the above calling data, so that the each packet switching node calculates a total sum of the sum $\Sigma$ Vavi of average transfer rates and a sum of the quantity of data transferred at a rate exceeding the average transfer rate Vavi during the predetermined time, that is, $$\sum_{i=1}^{N}\left[\left\{\sum_{m=0}^{M}\int_{\Delta t \cdot m(>Vavi)}^{\Delta t(m+1)} \text{traffic}(t)i - Vavi\, dt\right\}/M\right]$$

where N denotes a multiplexing number; and estimates the line quality of the trunk line in question on the basis of the calculated total sum value, and M denotes the number of durations divided by unit time $\Delta t$.

Figure 11:
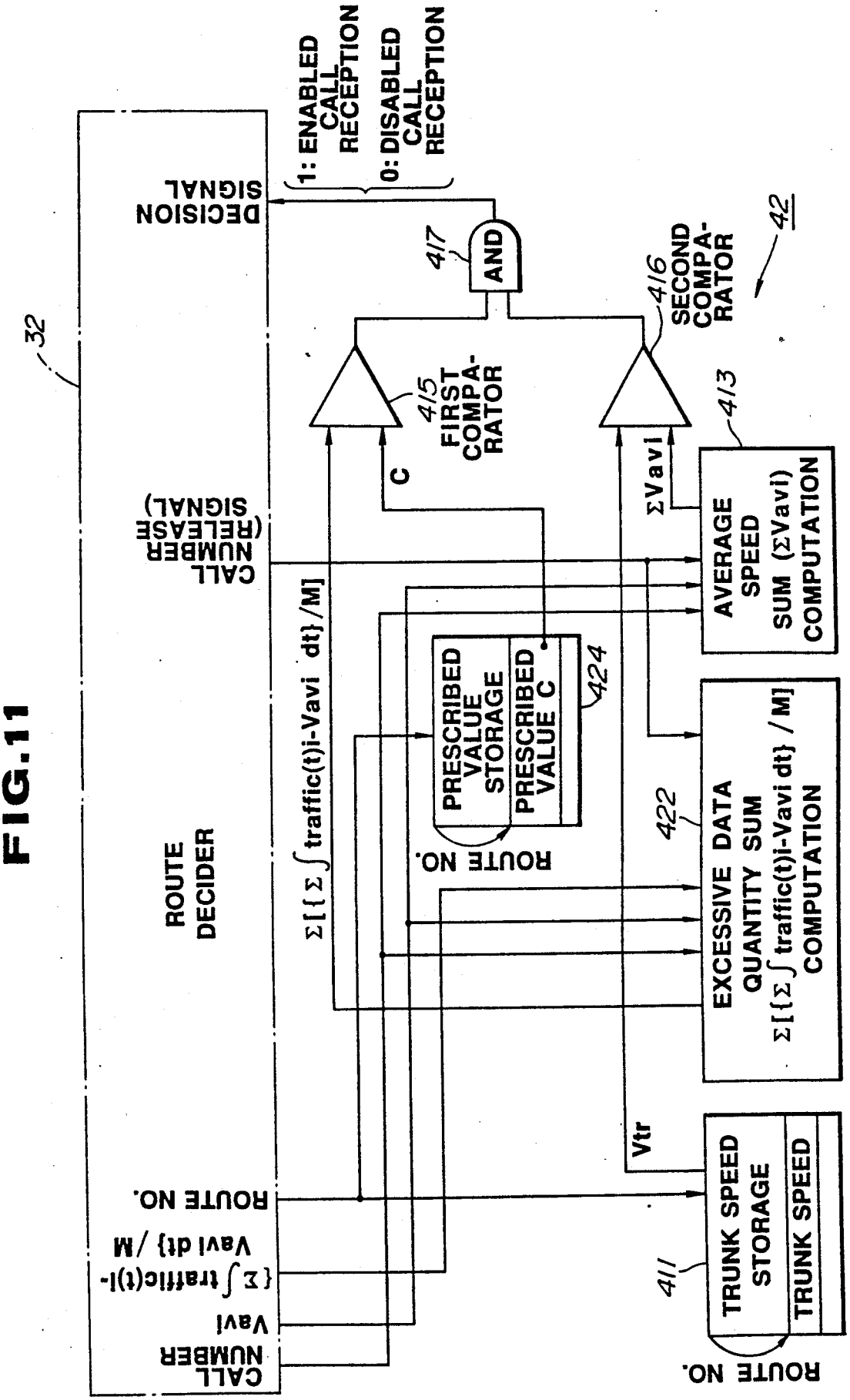
FIG. 11 is a block diagram showing an exemplary specific arrangement of a line resource controller used in a further embodiment of the network controller to which the call restricting method of the present invention is applied.

Shown in FIG. 11 is a further embodiment of the network controller to which the call restricting method of the present invention is applied, showing an exemplary specific arrangement of a line resource controller 42 embodying the call restricting function based on such improved line quality estimation as mentioned above.

More specifically, in the embodiment of FIG. 11, the terminal 110, when demanding a call of the associated packet switching node, informs the associated packet switching node of both the average transfer rate Vavi on the communication data of its own terminal and the traffic quantity of the communication data transferred during a predetermined time together with the aforementioned calling data, as mentioned above. The average transfer rate Vavi and the traffic data quantity transferred during the predetermined time are analyzed at the calling protocol analyzer provided in the associated network controller and the analyzed contents are informed from the line resource controller 42 to a route decider 32.

The route decider 32, which has basically the same function as the route decider 30 or 31 shown in FIG. 4 or 8, previously calculates an average excessive quantity of traffic data transferred during the predetermined time each time it receives the analyzed information from the line resource controller 42 on the basis of the traffic data quantity and average transfer rate Vavi, that is, $$\left\{\sum_{m=0}^{M}\int_{\Delta t \cdot m(>Vavi)}^{\Delta t(m+1)} \text{traffic}(t)i - Vavi\, dt\right\}/M$$

and informs the line resource controller 42 of the calculated average excessive data quantity, as shown in FIG. 11.

The line resource controller 42 in the present embodiment shown in FIG. 11 is different from the line resource controller 41 of FIG. 8 in that, in place of the components (b) and (d) in FIG. 8, that is, (b) the difference sum computing part 412 which receives a value Vmaxi indicative of the maximum transfer rate and a value Vavi indicative of the average transfer rate together with the call number among the traffic parameters informed from the route decider 31 and computes a sum $\Sigma$ (Vmaxi−Vavi) of differences between the maximum and average transfer rates on the trunk line in the trunk line in question when the communication data of the call origination terminal is multiplexed on the trunk line on the basis of these values so far informed from the route decider 31, and (d) the prescribed value storage 414 in which a limit value of the sum $\Sigma$ (Vmaxi−Vavi) of differences between the maximum and average transfer rates with respect to trunk lines connected to the node in question is previously stored or registered and which determines and outputs one of the limit values corresponding to the route No. informed from the route decider 31 as a prescribed value C.

New components (b) and (d) are provided in FIG. 11, that is, (b) an excessive data quantity computing part 422 which receives, together with the call number, the quantity of data transferred from the terminal at a rate exceeding the average transfer rate during the predetermined time, that is, the above excessive data quantity, $$\left\{\sum_{m=0}^{M}\int_{\Delta t \cdot m(>Vavi)}^{\Delta t(m+1)} \text{traffic}(t)i - Vavi\, dt\right\}/M$$

among the traffic parmeters informed from the route decider 32 and computes a sum of excessive data quantities transferred at a rate exceeding the average transfer rate during the predetermined time, that is, $$\sum_{i=1}^{N}\left[\left\{\sum_{m=0}^{M}\int_{\Delta t \cdot m(>Vavi)}^{\Delta t(m+1)} \text{traffic}(t)i - Vavi\, dt\right\}/M\right]$$

when the communication data of the call origination terminal is multiplexed on the trunk line on the basis of these values so far informed from the route decider 32, and (d) a prescribed value storage 424 in which a limit value of the sum $\Sigma$ (Vmaxi−Vavi) of differences between the maximum and average transfer rates with respect to trunk lines connected to the node in question is previously stored or registered and which determines and outputs one of the limit values corresponding to the route No. informed from the route decider 31 as a prescribed value C.

That is, the line resource controller 42 estimates the line quality of a trunk line designated by the route No. informed from the route decider 32 when the new call origination terminal is also added, on the basis of the trunk rate Vtr of the designated trunk line, traffic parameters of terminals being using the trunk line informed from the route decider 31, i.e., the average transfer rate Vavi and the excessive data quantity indicative value $\{\Sigma f \text{ traffic } \{t\}i - V\text{avi } dt\}/M$, the average transfer rate Vavi of communication data of a call origination terminal and the excessive data quantity indicative value $\{\Sigma f \text{ traffic } \{t\}i - V\text{avi } dt\}/M$ newly informed from the route decider 32; and instructs the route decider 32 to accept the call from the call origination terminal only when the estimated line quality can be maintained to be higher than a predetermined line quality which can satisfy the transmission quality conditions demanded by the respective terminals using the same trunk line. The line resource controller 42, in particular, can output to the route decider 32 the decision signal of logical value "1" indicative of "enabled call acception" only under the conditions that the following relationships (6) and (7) are satisfied when the new call origination terminal is newly added, where subscript i is denoted by i=1 to N.

$$\sum_{i=1}^{N}\left[\left(\sum_{m=0}^{M}{}_{\Delta t \cdot m(> V\text{avi})}^{\Delta t(m+1)} \text{traffic}(t)i - V\text{avi } dta\right)/M\right] < C \quad (6)$$

$$\sum_{i=1}^{N} V\text{avi} < Vtr \quad (7)$$

Examination will be made as to how the call restricting operation is actually provided and under what conditions, by referring to an actual specific example.

Figure 12:
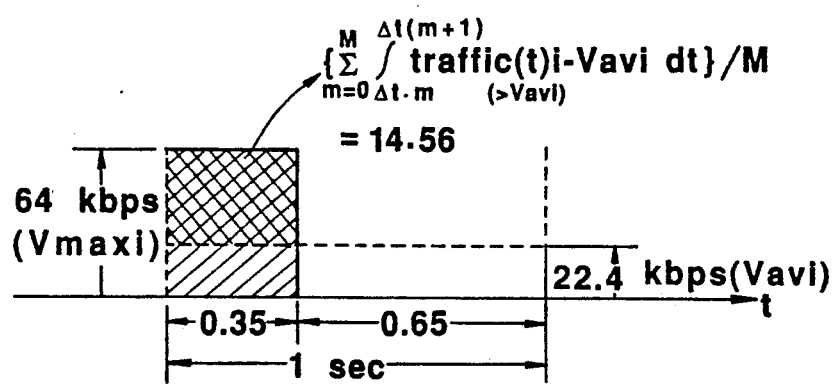
FIG. 12 is a timing chart showing, in a model form, the idea "a sum of data quantity values transferred at a rate exceeding the average transfer rate within a period of certain constant time" of an excessive-data-quantity sum computing part used in FIG. 11.

When the trunk rate Vtr of the decided trunk line is set to be 1.5 Mbps as in the foregoing case, the prescribed value C for the same route is set to be 0.8 Mbps, terminals based on multiplex communication are of a voice type having a maximum transfer rate of 64 kbps and an average transfer rate of 22.4 kbps as in the foregoing case, and further the above excessive data quantity during the predetermined time (1 sec.) is obtained from a relationship shown in FIG. 12 as, $$\left\{\sum_{m=0}^{M}{}_{\Delta t \cdot m(> V\text{avi})}^{\Delta t(m+1)} \text{traffic}(t)i - V\text{avi } dt\right\}/M = 14.56 \text{ kbps}$$

The above conditions of the relationships (6) and (7) can be rewritten as follows.

$$\Sigma\ 14.56\ \text{kbps} < 0.8\ \text{Mbps} \quad (6)'$$

$$\Sigma\ 22.4\ \text{kbps} - 1.5\ \text{Mbps} \quad (7)'$$

Accordingly, in this case, when the multiplexing number is 55, the line resource controller 42 (more precisely, the first comparator (415) provides the call restricting operation at least in accordance with the relationship (6)'.

In this connection, the above value "0.8 Mpbs" for the prescribed value C and the value "55" for the multiplexing number are determined based on such an characteristic curve showing a relationship between multiplexing number and discard rate as exemplified in FIG. 9.

Another example will be examined when a 64 kbps terminal which is not restricted to a voice type is unrestrictedly multiplexed on the same trunk line as the above case. In this case, the maximum and average transfer rates Vmaxi and Vavi per unit time become equal to each other as exemplified in FIG. 10 in its data transfer form. That is, $V\text{maxi} = 64\ kbps$ $V\text{avi} = 64\ kbps$ Hence, the above excessive data quantity becomes as follows.

$$\left\{\sum_{m=0}^{M}{}_{\Delta t \cdot m(> V\text{avi})}^{\Delta t(m+1)} \cdot reDDIX(T)I = V\text{avi } dt\right\}/M = 0\ \text{kbps}$$

Eventually, the above conditions of the relationships (6) and (7) are also rewritten as follows.

$$\Sigma\ 0\ \text{kbps} < 2.3\ \text{Mbps} \quad (6)''$$

$$\Sigma\ 64\ \text{kbps} < 1.5\ \text{Mbps} \quad (7)''$$

Thus, the multiplexing number is 23, the line resource controller 42 (more precisely, the second comparator (416) provides the call restricting operation at least in accordance with the condition (7)''.

In this way, even in the present embodiment, the call restriction can be realized suitably according to the every time application state of the trunk line on the basis of the logical "AND" condition of the relationships (6) and (7). Further, since the embodiment shown in FIG. 11 suitably reflects an actual change in the data transfer quantity during the predetermined time for each terminal, it can be prevented as in the foregoing embodiment of FIG. 8 that a call is refused more often than the network needs. Furthermore, the other operation of the line resource controller 42 in the embodiment including disconnecting operation is substantially the same as that of the line resource controller 40 or 41 shown in FIG. 4 or 8, and thus explanation thereof is omitted.

Figure 13:
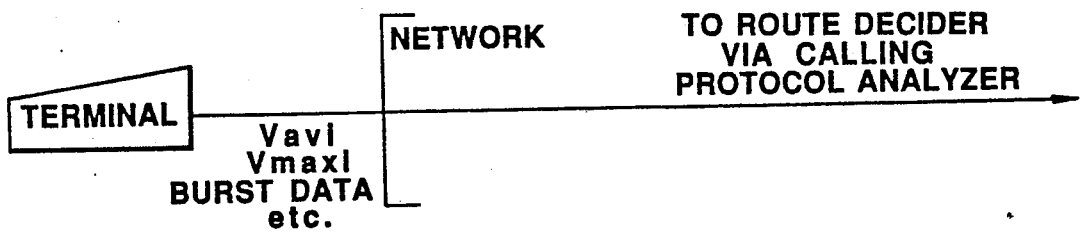
FIGS. 13, 14 and 15 are block diagrams showing different embodiments of how to send to an associated packet switching node traffic parameters of various attributes of terminals to be handled in the call restricting method of the present invention, respectively.

The foregoing embodiments have been explained on the assumption that, for example as shown in FIG. 13, the traffic parameters to be handled are informed from the respective terminals directly to the associated packet switching node. However, such a parameter informing technique may be arbitrarily selected as necessary. For example, as shown in FIG. 14 or 15, a table or tables suitable for notification of traffic parameters may be provided so that the network can be indirectly informed of the corresponding parameters.

Figure 14:
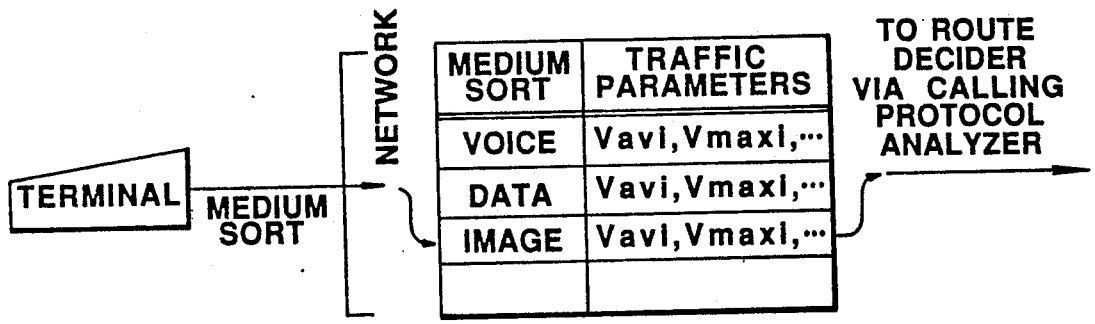
Figure 15:
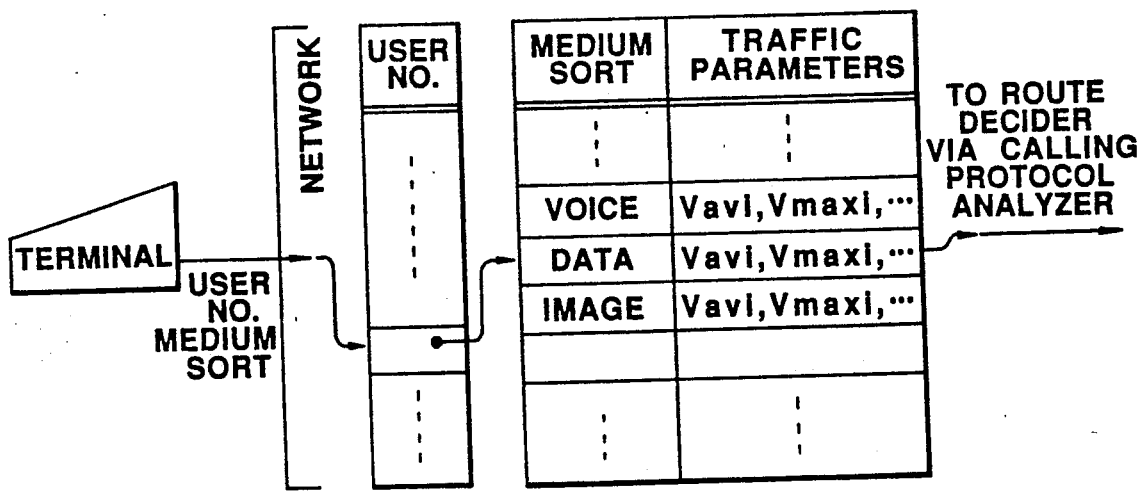

In more detail, FIG. 14 shows a method of informing the network of parameters in such a manner as detailed below including steps (A) and (B):

(A) Each terminal 110, when wishing to issue a call, sends a data indicative of "terminal medium attribute" together with the calling data to the network.

(B) The network (the associated packet switching node), which has a parameter table, selectively reads out necessary traffic parameters corresponding to the received data "terminal medium attribute (for example, voice medium, data medium, picture medium, and so on) from the parameter table and informs the route decider via the calling protocol analyzer of the traffic parameters read out from the table. Meanwhile, FIG. 15 shows a method of informing the network of parameters in such a manner as detailed below including steps (A) and (B):

(A) Each terminal 110, when it is desired to issue a call from the terminal, sends to the network not only the data "terminal medium attribute" but also a data "user No." together with the calling data.

(B) The network (the associated packet switching node), which has a plurality of attributes of parameter tables in which a plurality of traffic parameters are previously stored as associated with the different "terminal medium attributes" with respect to each of registered users and a user table listing retrieval addresses for the parameter tables to be designated by the data "user No." and "terminal medium attribute" informed from the terminal, (1) designates one of the parameter table retrieval addresses of the user table according to the data "user No." and "terminal medium attribute" informed from the terminal, and (2) retrieves one of the parameter tables corresponding to the designated retrieval address, reads out traffic parameters previously registered in the corresponding area from the retrieved parameter table, and informs the route decider via the calling protocol analyzer of the traffic parameters read out from the parameter table. In particular, in the case of FIG. 15, the setting and notification of traffic parameters can be finely controlled according to user's usage even for an identical terminal. When the parameter informing method exemplified in FIG. 14 or 15 is employed, the above tables may be provided within the calling protocol analyzer or within the terminal interface 17 (see FIG. 1).

Although the network controllers exemplified in each of the foregoing embodiments have been explained to be independent of each other for the sake of explanation, it goes without saying that these network controllers may also be suitably combined to realize a more reliable network controller.

What is claimed is:

1. In a packet switching network comprising a plurality of packet switching nodes connected to terminals and a plurality of trunk lines connected between said plurality of packet switching nodes, wherein each of said packet switching nodes analyzes a calling data issued from a call origination terminal connected to its own packet switching node, determines, on the basis of an analyzed result, destination one of the packet switching nodes connected with a destination terminal to which said calling data is to be sent and also determines at least one trunk line leading to said destination packet switching node, and sends from said call origination terminal to said destination terminal the calling data and also sends communication data to be sent to the destination terminal through said determined trunk line in a packet form when a calling condition is satisfied;

a call restricting method for said packet switching network, wherein said call origination terminal informs associated one of said packet switching nodes connected with the call origination terminal of traffic parameters of its own terminal indicative of a traffic line application state or a data designating said traffic parameters together with said calling data, one of said packet switching nodes informed of the traffic parameters and calling data estimates a line quality of the trunk line determined based on the calling data when the call origination terminal is added, on the basis of a trunk rate of said determined trunk line, traffic parameters informed from terminals using the trunk line at this time and said traffic parameters informed from the call origination terminal, and accept said calling data from the call origination terminal only when said estimated line quality is maintained to be higher than a predetermined level that can satisfy transmission quality conditions demanded by said terminals using the trunk line.

2. A call restricting method for a packet switching network as set forth in claim 1, wherein said traffic parameters include a value indicative of an average transfer rate of the communication data of said call origination terminal, a value indicative of a maximum transfer rate of the communication data of the call sender terminal, a value indicative of a quantity of data in the terminal communication data transferred during a predetermined time, and a data indicative of a size of bursting property of the terminal communication data.

3. A call restricting method for a packet switching network as set forth in claim 2, wherein said traffic parameters informed from said call origination terminals include a value indicative of said average transfer rate of said communication data and said data indicative of the size of bursting property of the communication data, and said packet switching node determines a line quality of said determined trunk line when terminals use the determined trunk line on a multiplex basis, on the basis of three values of a total average transfer rate sum corresponding to an addition of a sum of the communication data average transfer rates of said terminals using the determined trunk line on the multiplex basis and said communication data average transfer rate of said call origination terminal, a data indicative of a size of new bursting property when said data indicative of the size of bursting property of said call origination terminal is added to a data indicative of a size of bursting property of said terminals using the determined trunk line, and said trunk rate of the determined trunk line, and accepts said calling data from the call origination terminal only when said determined line quality is maintained to be higher than said predetermined level.

4. A call restricting method for a packet switching network as set forth in claim 3, wherein said data indicative of the size of bursting property of said communication data corresponds to a value obtained by dividing the value of said maximum transfer rate of the communication data of said terminal by the value of said average transfer rate of the communication data.

5. A call restricting method for a packet switching network as set forth in claim 3, wherein said data indicative of the size of bursting property of said communication data corresponds to a value obtained by dividing the value of said maximum transfer rate of the communication data of said terminal by the value of said average transfer rate of the communication data, and to a value indicative of a maximum susstained time of the communication data during which its transfer rate exceeds said average transfer rate.

6. A call restricting method for a packet switching network as set forth in claim 2, wherein said traffic parameters informed from said call origination terminals include a value indicative of said average transfer rate of said communication data and said data indicative of said maximum transfer rate of the comuniction data, and said packet switching node calculates a total average transfer rate sum corresponding to an addition of a sum of the communication data average transfer rates of said terminals using the determined trunk line on the multiplex basis and also calculates a total difference sum of a sum of differences between said communication data maximum and average transfer rates of said terminals using said determined trunk line on the multiplex basis and a subtraction of said communication data average transfer rate from said communication data maximum transfer rate for said call origination terminal, and estimates a line quality of the determined trunk line on the basis of said total average transfer rate sum and said total difference sum thus calculated.

7. A call restricting method for a packet switching network as set forth in claim 6, wherein said packet switching node accepts said calling data from said call origination terminal only when a logical "AND" condition is satisfied that said total average transfer rate sum is smaller than said trunk rate of said determined trunk line and that said total difference sum is smaller than a predetermined value.

8. A call restricting method for a packet switching network as set forth in claim 2, wherein said traffic parameters informed from said call origination terminals include a value indicative of said average transfer rate of said communication data and a value indicative of a quantity of data in the terminal communication data transferred during a predetermined time, and said packet switching node calculates a total average transfer rate sum corresponding to an addition of a sum of the communication data average transfer rates of said terminals using the determined trunk line on the multiplex basis and also calculates a total excessive data quantity sum of a sum of quantities of data transferred at a rate exceeding said average transfer rate during a predetermined time with respect to said terminals using said determined trunk line on the multiplex basis and said quantity of data transferred at a rate exceeding said average transfer rate during said predetermined time with respect to said call origination terminal, and estimates a line quality of the determined trunk line on the basis of said total average transfer rate sum and said total excessive data quantity sum.

9. A call restricting method for a packet switching network as set forth in claim 8, wherein said packet switching node accepts said calling data from said call origination terminal only when a logical "AND" condition is satisfied that said total average transfer rate sum is smaller than said trunk rate of said determined trunk line and that said total excessive data quantity sum is smaller than a predetermined value.

10. A call restricting method for a packet switching network as set forth in claim 2, wherein said traffic parameters are informed from said respective terminals directly to the associated packet switching nodes.

11. A call restricting method for a packet switching network as set forth in claim 2, wherein said traffic parameters are previously prepared in the form of a table containing the traffic parameters listed as associated with medium attributes of said terminals, and when one of the terminals informs said table of associated one of said terminal medium attributes, the table designates ones of the traffic parameters corresponding to said informed terminal medium attribute and informs the associated packet switching node of said designated parameters.

12. A call restricting method for a packet switching network as set forth in claim 2, wherein said traffic parameters are previously prepared in the form of a table containing the traffic parameters listed as associated with user numbers and medium attributes of said terminals, and when one of the terminals informs said table of associated one of said user numbers and one of said terminal medium attributes, the table designates ones of the traffic parameters corresponding to said informed user number and said terminal medium attribute and informs the associated packet switching node of said designated parameters.

13. In a packet switching network including a plurality of packet switching nodes connected respectively with various attributes of medium terminals and a plurality of trunk lines connected between said plurality of packet switching nodes;
a network controller having a call restricting function and provided in each of the packet switching nodes, said network controller being connected with said various attributes of medium terminals so that, when call origination one of the terminals demands a data communication with destination one of the terminals, the network controller realizes logical interconnection between said call origination terminal and said destination terminal through at least one of the trunk lines; said network controller comprising:
route deciding means for deciding at least one of the trunk lines to be used for said logical interconnection with said call origination terminal;
analyzing means for receiving a calling data informed from the call origination terminal and traffic parameters indicative of an application state of said decided trunk line and for analyzing contents of said calling data and contents of said traffic parameters; and
line resource controlling means for determining whether or not to accept said calling data from the call origination terminal,
wherein said analyzing means informs said route deciding means of said analyzed contents of the call data and parameters, said route deciding means decides one of the trunk lines to be used for the logical interconnection and informs said line resource controlling means of an identification data of said decided trunk line and also the contents of the informed traffic parameters, and said line resource controlling means estimates a line quality of the decided trunk line when said call origination terminal is added on the basis of a trunk rate of the decided trunk line designated based on said identification data of the trunk line, traffic parameters of terminals using the decided trunk line so far informed through said route deciding means and traffic parameters of the call origination terminal newly informed from said route deciding means, and accepts the calling data from the call origination terminal only when said estimated line quality is maintained to be higher than a predetermined level which can satisfy transmission quality conditions demanded by said terminals using the decided trunk line.

14. A network controller having a call restricting function as set forth in claim 13, wherein said traffic parameters include a value indicative of an average transfer rate of said communication data and a data indicative of a size of bursting property of the communication data, and said line resource controlling means includes:

trunk rate storage means for previously storing therein trunk rates for the trunk lines connected with said network controller and for designating and outputting one of said trunk rates according to said identification data of the trunk line informed from said route deciding means;

line burst computing means for receiving said data indicative of the size of bursting property among said traffic parameters informed from said route deciding means and for computing a new data indicative of a size of bursting property of the decided trunk line when the communication data of said call origination terminal is multiplexed on the trunk line on the basis of the data so far informed through said route deciding means;

average rate sum computing means for receiving values of said average transfer rates among the traffic parameters informed from said route deciding means and for computing a sum of the average transfer rate values of the decided trunk line when the communication data of the call origination terminal is multiplexed on the trunk line on the basis of the values so far informed through the route deciding means;

quality computing means for computing and predicting a line quality of the decided trunk line when the communication data of the call origination terminal is multiplexed on the trunk line on the basis of outputs of said trunk rate storage means, line burst computing means and average rate sum computing means;

limit quality value holding means for previously registering and holding therein a limit value which can satisfy transmission quality conditions demanded by the terminals using the decided trunk line; and comparison means for comparing said line quality computed and predicted at said quality computing means with said limit value held in said limit value holding means and for outputting a decision signal indicative of "enabled call acception" when said predicted line quality is maintained to be higher than the limit value held in the limit quality value holding means and otherwise outputting a decision signal indicative of "disabled call acception".

15. A network controller having a call restricting function as set forth in claim 14, wherein said quality computing means includes three stages of data tables which are to be searched and read by outputs of said trunk rate storage means, line burst computing means and average rate sum computing means respectively on the basis of outputs read out from previous ones of said three stages of data table, and said quality computing means outputs a data which is read out and outputted from the final stage of data table, as said line quality of the decided trunk line.

16. A network controller having a call restricting function as set forth in claim 14, wherein said quality computing means includes: a first data table which is to be searched on the basis of the output of said trunk rate storage means to read out and output a first stage of predicted quality data therefrom, a second data table which is to be searched by an output of said average rate sum computing means on the basis of said first stage of predicted quality data received from said first data table to read out and output a second stage of predicted quality data therefrom, and a third data table which is to be searched by an output of said line burst computing means on the basis of said second stage of predicted quality data received from said second data table to read out and output a third stage of predicted quality data therefrom, said third stage of predicted quality data outputted from said third data table being used as the line quality of said decided trunk line.

17. A network controller having a call restricting function as set forth in claim 16, wherein said first and second data tables having respectively an NG area for storing data which is unable to satisfy a prescribed quality and when said first or second stage of predicted qualtity data is outputted from said NG area, said line resource controlling means unconditionally outputs a decision signal indicative of "disabled call acception".

18. A network controller having a call restricting function as set forth in claim 14, wherein said route deciding means outputs as a release signal an identification data of said call origination terminal to said line burst computing means and said average rate sum computing means when the call origination terminal finishes the data communication, and the line burst computing means and average rate sum computing means, when receiving said release signal, delete said data indicative of the size of bursting property or said average transfer rate value with respect to the associated trunk line.

19. A network controller having a call restricting function as set forth in claim 13, wherein said traffic parameters include the value of said average transfer rate of the communication data and the value of said maximum transfer rate, and said line resource controlling means includes:

trunk rate storage means for previously storing therein trunk rates for the trunk lines connected with said network controller and for designating and outputting one of said trunk rates according to said identification data of the trunk line informed from said route deciding means;

difference sum computing means for receiving both the maximum transfer rate value and the average transfer rate value among said traffic parameters informed from said route deciding means and for computing a difference sum of differences between the maximum and average transfer rates of the trunk line when the communication data of said call origination terminal is multiplexed on the trunk line on the basis of these values so far informed through said route deciding means;

average rate sum computing means for receiving values of said average transfer rates among the traffic parameters informed from said route deciding means and for computing a sum of the average transfer rate values of the decided trunk line when the communication data of the call origination terminal is multiplexed on the trunk line on the basis of the values so far informed through the route deciding means;

limit value storage means for previously registering and storing therein limit values of said difference sums with respect to the trunk lines connected with said network controller and for designating and outputting one of said limit values corresponding to the identification data of the trunk line informed from said route deciding means;

first comparison means for comparing said difference sum computed at said difference sum computing means with said limit value designated at said limit value storage means and for outputting a comparison signal having a first logical value when the difference sum is smaller than the designated limit value and otherwise outputting a comparison signal having a second logical value;

second comparison means for comparing said average transfer rate sum computed at said average rate sum computing means with the trunk rate value designated at said trunk rate storage means and for outputting a comparison signal having the first logical value when the average rate sum is smaller than the designated trunk rate value and otherwise outputting a comparison signal having the second logical value; and logical operation means for outputting a decision signal indicative of "enabled call acception" under a logical "AND" condition that said comparison output signals of said first and second comparison means both have said first logical value.

20. A network controller having a call restricting function as set forth in claim 19, wherein said route deciding means outputs as a release signal an identification data of said call origination terminal to said difference sum computing means and said average rate sum computing means when the call origination terminal finishes the data communication, and the difference sum computing means and average rate sum computing means, when receiving said release signal, delete said data indicative of the size of bursting property or said average transfer rate value with respect to the associated trunk line.

21. A network controller having a call restricting function as set forth in claim 13, wherein said traffic parameters include the value of said average transfer rate of the communication data and the value of a quantity of the communication data transferred during a predetermined time, said route deciding means informs said line resource controlling means of the identification data of the trunk line, the value of the average transfer rate of the communication data and the value of an excessive data quantity of the communication data transferred at a rate exceeding the average transfer rate during the predetermined time, and said line resource controlling means includes:

trunk rate storage means for previously storing therein trunk rates for the trunk lines connected with said network controller and for designating and outputting one of said trunk rates according to said identification data of the trunk line informed from said route deciding means;

excessive data quantity sum computing means for receiving the value of said excessive data quantity among said traffic parameters informed from said route deciding means and for computing a sum of the excessive data quantities of the trunk line when the communication data of said call origination terminal is multiplexed on the trunk line on the basis of these values so far informed through said route deciding means;

average rate sum computing means for receiving values of said average transfer rates among the values informed from said route deciding means and for computing a sum of the average transfer rate values of the decided trunk line when the communication data of the call origination terminal is multiplexed on the trunk line on the basis of the values so far informed through the route deciding means;

limit value storage means for previously registering and storing therein limit values of said excessive data quantity sums with respect to the trunk lines connected with said network controller and for designating and outputting one of said limit values corresponding to the identification data of the trunk line informed from said route deciding means;

first comparison means for comparing said excessive data quantity sum computed at said excessive data quantity sum computing means with said limit value designated at said limit value storage means and for outputting a comparison signal having a first logical value when the excessive data quantity sum is smaller than the designated limit value and otherwise outputting comparison signal having a second logical value;

second comparison means for comparing said average transfer rate sum computed at said average rate sum computing means with the trunk rate value designated at said trunk rate storage means and for outputting a comparison signal having the first logical value when the average rate sum is smaller than the designated trunk rate value and otherwise outputting a comparison signal having the second logical value; and logical operation means for outputting a decision signal indicative of "enabled call acception" under a logical "AND" condition that said comparison output signals of said first and second comparison means both have said first logical value.

22. A network controller having a call restricting function as set forth in claim 21, wherein said route deciding means outputs as a release signal an identification data of said call origination terminal to said excessive data quantity sum computing means and said average rate sum computing means when the call origination terminal finishes the data communication, and the excessive data quantity sum computing means and average rate sum comuting means, when receiving said release signal, delete said excessive data quantity value or said average transfer rate value with respect to the associated trunk line.

* * * * *